No. 830,169. PATENTED SEPT. 4, 1906.
E. PORTER.
ROPE AND ROPE SOCKET PROTECTOR SPEAR.
APPLICATION FILED DEC. 4, 1905.
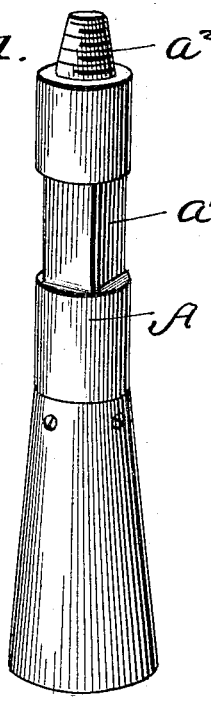
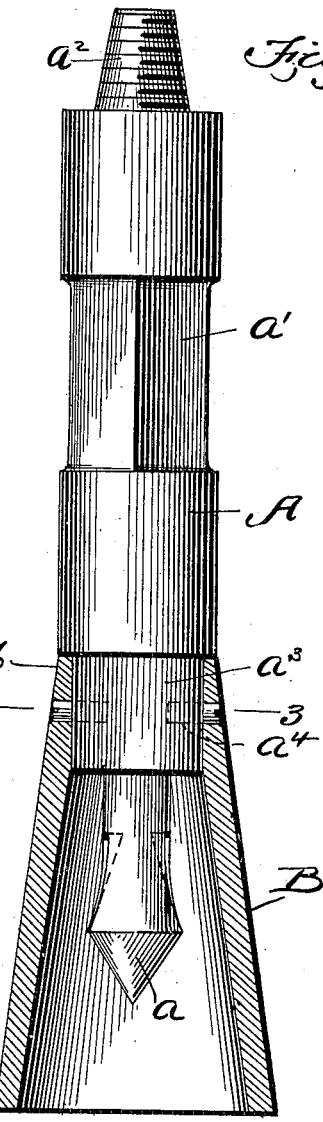
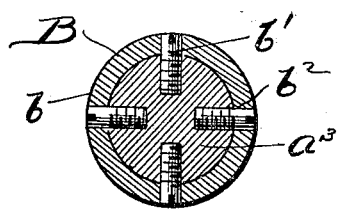
WITNESSES:
M. D. Blandel
E. B. McBath
INVENTOR
E. Porter.
BY
Meard Brock
ATTORNEYS

UNITED STATES PATENT OFFICE.

ERNEST PORTER, OF MONTICELLO, KENTUCKY.

ROPE AND ROPE-SOCKET-PROTECTOR SPEAR.

No. 830,169.  Specification of Letters Patent.  Patented Sept. 4, 1906.

Application filed December 4, 1905. Serial No. 290,297.

*To all whom it may concern:*

Be it known that I, ERNEST PORTER, a citizen of the United States, residing at Monticello, in the county of Wayne and State of Kentucky, have invented a new and useful Rope and Rope-Socket-Protector Spear, of which the following is a specification.

My invention relates to certain new and useful improvements in rope-socket and rope-socket-protector spears for the purpose of removing rope and rope-sockets from wells.

The object of my invention is to provide an attachment for rope-spears that is very simple and cheap in construction and one that can be readily attached to any spear now in use.

A further object of my invention is to provide an attachment for a rope-socket spear that will guide the spear into the opening in the socket or the rope-socket protector, as the case may be.

With these various objects in view my invention consists in the novel construction and arrangement of parts hereinafter more fully described, and illustrated in the accompanying drawings, in which—

Figure 1 is a side elevation of a rope-spear with the attachment in place. Fig. 2 is a side view of a rope-spear, showing the attachment in section. Fig. 3 is a sectional view taken on line 3 3 of Fig. 2.

Referring more particularly to the drawings, A indicates the rope-spear, and B the attachment. The rope-spear A is of the ordinary construction, being provided with a spear-point $a$, a square wrench-receiving portion $a'$, and a threaded end $a^2$ for connecting the spear with the operating mechanism. The lower portion of the spear A is formed with a circular reduced portion $a^3$, provided with circular screw-threaded recesses $a^4$, by means of which the attachment B is secured thereon.

The attachment B is in the form of a funnel-shaped guide, and the neck portion $b$ is adapted to fit over the circular reduced portion $a^3$ of the spear and to be secured thereon by machine-screws $b'$, which pass through the openings $b^2$ in the neck portion of the funnel-shaped guide and are screwed into the recesses $a^4$ in the spear.

By providing a rope-spear with a funnel-shaped guide, as described, it will be seen that I overcome the difficulties that heretofore existed in fishing for lost rope-sockets, especially in large wells, as the socket will be guided by the funnel to the point of the spear, which will find its way into the opening of the socket or socket-protector, as the case may be, and the socket can be readily removed in the ordinary manner.

Having thus fully described my invention, what I claim as new, and desire to secure by Letters Patent, is—

1. In a device of the kind described, the combination with a spear, of a circular reduced portion formed on the lower end of the spear and a funnel-shaped guide fitting over said reduced portion, for the purpose described.

2. In a device of the kind described, the combination with a spear, of a funnel-shaped guide arranged on the lower end of said spear and extending down below the point of said spear, and means for securing said funnel to said spear, for the purpose described.

ERNEST PORTER.

Witnesses:
 W. H. LEECE,
 I. H. ATHERTON.